June 18, 1968 C. MACDONALD 3,389,221

TELEVISION BRIGHTNESS COMPENSATION SYSTEM

Filed April 29, 1964

INVENTOR
Copthorne Macdonald
BY
Charles F. Renz
ATTORNEY 3,389,221

TELEVISION BRIGHTNESS COMPENSATION SYSTEM

Copthorne Macdonald, Elmira, N.Y., assignor to Westinghouse Electric Corporation, East Pittsburgh, Pa., a corporation of Pennsylvania Filed Apr. 29, 1964, Ser. No. 363,528
10 Claims. (Cl. 178—7.2)

ABSTRACT OF THE DISCLOSURE

This invention relates to a slow scan television system illustratively including a television camera device having a target element which is scanned by an electron beam in a predetermined interval of time to provide an output video signal, a variable gain amplifier to which the output video signal is applied, an amplitude discriminating circuit for measuring the amplitude of an output signal derived from the amplitude discriminating circuit. The amplitude discriminating circuit provides an output signal indicative of a decrease of amplitude of the output video signal below a predetermined level. If the amplitude of the output video signal remains below the predetermined value for a period in excess of the predetermined interval, the time and delay circuit will effect a change in the gain of the variable gain amplifier.

Figures 1, 2:
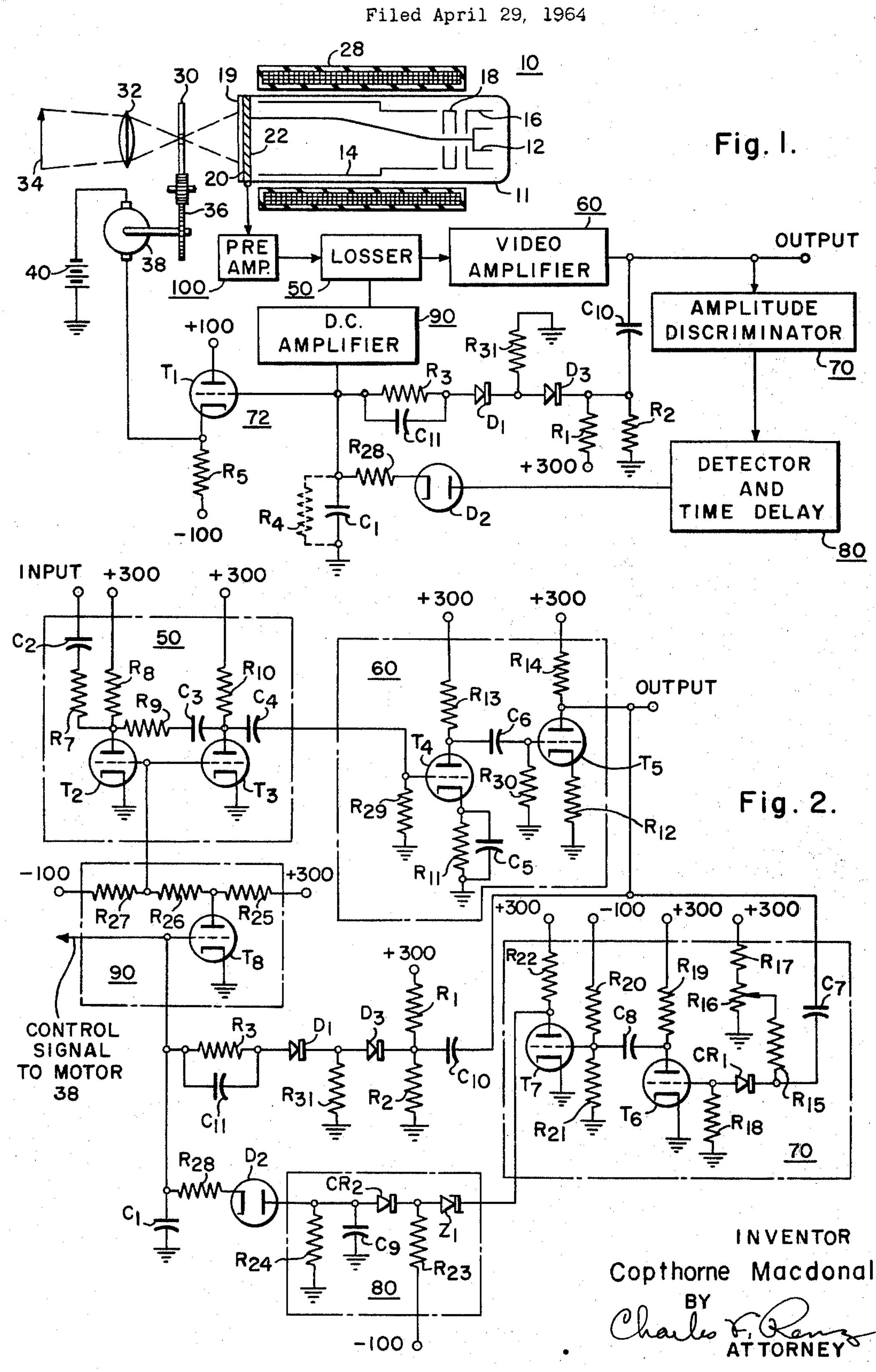

This invention relates generally to an improvement in television systems, and, more particularly, to slow scan television systems wherein compensation for variations in the intensity of the viewed image is provided.

Common to all television systems is the problem of compensating for variations in the brightness or intensity of the viewed image. For many years compensation was achieved by either manually adjusting the iris of the lens of the television camera, the target voltage of the television camera tube, or the gain of the video amplifier. Within the last few years, a light intensity compensation system for a vidicon image tube has been suggested; in general, this system utilized either the average camera tube output current or the signal level in a feedback circuit to control the target voltage. It may be noted that such a system was specifically designed for a vidicon tube being scanned at the usual 30 frame per second standard.

Recently, much attention has been given to what is generally known as a slow scan television system. As in the conventional television system, a scanning process is used in which a transmitting spot and a reproducing spot are moved in synchronism and in similar patterns over the image to be transmitted and the viewing screen, respectively, the intensity of the reproducing spot being controlled by the intensity of the transmitting spot. The primary significance of a slow scan television is that the rate at which the image is scanned by an electron beam has been significantly reduced from the standard rate of 30 frames per second. On common slow scan television systems, the scanning period has been set at values ranging from a full second up to several minutes or more. In addition, it has been suggested that such slow scan television systems could easily be adapted to transmit single pictures instead of a continuously moving image. One of the primary benefits of such slow scan television systems is that the bandwidth required of a transmission system has been significantly reduced. Therefore, a common telephone line or even an amateur communication system could be adapted to transmit the video signal of such a system.

However, narrow bandwidth slow scan television systems do present special problems. First, the range of target voltages on available slow-scan vidicon camera tubes is not great. A slow scan vidicon may have a maximum target voltage of approximately 15 volts whereas a conventional vidicon might have a rating of 70 to 100 volts. As a result any attempt to reduce the target voltage below a value of 3 or 4 volts will produce objectionable shading effects due to beam landing errors found with conventional deflection components. Therefore, it may be seen that attempts to compensate a slow scan television by varying the vidicon target voltage would have significant undesired side results.

Other methods of compensating for the intensity of the viewed image have involved the varying of the gain of the video amplifier and/or adjusting the intensity of the light received by the vidicon target by such means as the lens iris. This invention primarily deals with a slow scan television system in which the variations of light intensity are compensated by the two methods mentioned immediately above. Specifically, this invention deals with the problems created by the extended period for scanning inherent in these systems. In a conventional television system with the conventional 30 frame per second scanning, the gain of the video amplifier may be regulated by a familiar AGC rectifier feedback circuit. Such circuits commonly use a resistance and diode in series to charge a capacitor, the voltage across which controls the gain of a video amplifier. Usually a reference voltage is established by a common voltage divider which sets the biasing voltage of the diode. When the voltage of the video amplifier exceeds the voltage set by the voltage divider, the diode will conduct allowing the capacitor to be charged thereby regulating the gain of the video amplifier. When the output of the video amplifier decreases, a resistor in parallel with the capacitor allows the capacitor to discharge thereby increasing the gain of the video amplifier. In a normal fast scan television system, this is satisfactory. A recovery time of approximately one second is not objectionable to the viewer and is sufficiently long so that in normal operation, there is no detectable change in the gain of the video amplifier during a single scanning frame. However, in slow scan systems where scan times may extend to many seconds or even minutes, a resistor in parallel with a capacitor to effect a discharge is not satisfactory. Normally an RC constant time of 10 to 100 times the frame period is required to keep the amplifier gain constant during a single frame. However, such an arrangement for a slow scan television system would be unsatisfactory. First, the capacitor required for such a system would be quite large and costly. More importantly, even if a time constant of 10 to 100 times was achieved such a recovery time could amount to approximately one hour; obviously, a system that would react at such a slow rate would be impractical.

Accordingly, it is the general object of this invention to provide a new and improved slow scan television system.

It is a more particular object of this invention to provide a new and improved slow scan television system capable of accurately and quickly responding to a change in light falling upon the image camera tube.

It is a more specific object of this invention to provide an improved light compensation system for a slow scan television system capable of detecting the output signal of a video amplifier during a given time interval before attempting to correct its output signal.

It is a still further object of this invention to provide an improved slow scan television system with a compensating circuit capable of responding to light levels over a range of 1000 to one.

Briefly, the present invention accomplishes the above cited objects by applying the signal output from the image pickup tube to a variable gain amplifier and applying the output of this amplifier to a feedback circuit capable of detecting the amplitude of the output signals of the amplifier below a predetermined level and timing this detected signal for a given time period to thereby control the gain of the amplifier. More specifically, the feedback circuit involves a storage means such as a capacitor with a discharge path controlled by a detector and time delay circuit, whereby the voltage across the capacitor may be discharged rapidly after a given interval during which a discriminating circuit has sensed the decrease in the amplifier output. As a result of the discharge of the storage means, the gain of the variable gain amplifier is readjusted so as to maintain the output signal at a given level. In addition, an error signal is taken from the storage means to control the setting of the picture tube iris to thereby achieve a light sensitivity over a greater range.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is a block diagram of a system for compensating the light intensity of a slow scan television system which embodies the present invention; and FIG. 2 is a schematic representation of a portion of the system of FIGURE 1 which includes the light compensation means of the present invention.

Referring now to FIGURE 1 of the drawings, a target type of camera or pick-up tube 10 is employed. Specifically a type WX–4384 or a type WL–7290 vidicon tube may be used in an embodiment of this invention. These tubes have been generally described in an article entitled "Slow-Scan TV Vidicons Developed," Electronics, May 11, 1962, pages 104, 106 and 107, by Copthorne Macdonald.

The tube 10 comprises an envelope 11 terminating in a transparent face plate 19 to which is juxtaposed or adhered a composite film comprising a conductive layer 20 serving as a signal output electrode, and a photoconductive layer 22 deposited thereon. An image of the illuminated object 34 to be televised is focused upon the photoconductive layer 22 by means of an optical lens 32, creating potential changes in the photoconductive layer 22. The photoconductive layer 22 is scanned by an electron beam produced by a cathode 12, controlled by a first grid 16, accelerated by a second grid 18, and focused, aligned and deflected by means of a focusing grid 14 and an alignment coil, focusing coil and deflecting coil conjointly represented by coil 28. Suitable operating currents may be applied to the coils 28 and suitable operating voltages are applied to the various grids, and to the tube filaments in a manner well known in the art.

The conductive layer 20, which serves as the output electrode of the tube 10, is connected to a preamplifier 100. The preamplifier is of a multiple stage type well known in the art and serves to amplify the output signal of the vidicon tube 10 and to apply the amplified signal to a losser amplifier 50. Losser amplifiers have a gain which is a function of a D.C. control voltage applied thereto. The output of the losser type of amplifier 50 is then applied to an ordinary video type of amplifier 60. It is noted that in one particular embodiment, the gain of amplifier 60 has been fixed; however, a variable gain amplifier with a gain greater than unity could be substituted for amplifiers 50 and 60 as shown and would operate just as well.

A first feedback circuit comprises a pair of diodes D1 and D3 connected in series with an isolating capacitor C10 and with a resistor R3 which is in turn connected in parallel with a capacitor C11. Normally diode D3 is back biased at a predetermined level by a suitable voltage source applied across resistors R1 and R2 to ground with the diode D3 connected to the point of interconnection of resistors R1 and R2. When the peak level of the output signal of the video amplifier 60 exceeds the biasing voltage applied to diode D3 as determined by resistors R1 and R2, the diode D3 will be placed in a conductive condition.

As diode D3 becomes conductive, a voltage is applied across resistor R31 to ground thereby biasing diode D1 to a conductive condition. When diodes D1 and D3 are biased in a conductive condition, capacitor C1 is thereby charged more negatively through resistor R3 and capacitor C11. As will be explained later, the voltage across capacitor C1 is used as an error signal to control the gain of the losser amplifier 50.

To this point the circuit described is a conventional AGC amplifier, except that no means has been provided to return the voltage across the capacitor C1 toward zero should the input signal be decreased. Conventional AGC circuits would use a resistor R4 across the capacitor C1 to effect this change. However, as explained above a resistive type of impedance is impractical to discharge the capacitor C1 within a reasonable length of time. Therefore, as this invention teaches a second feedback circuit is necessary in slow scan television systems to achieve a proper discharge of the voltage across capacitor C1. This second feedback circuit comprises an amplitude discriminator 70 which responds only to the peaks of the output signals of the video amplifier 60 below a predetermined level. The output response of the amplitude discriminator 70 is then applied to a detector and time delay circuit 80 which will respond only when amplitude discriminator 70 has not sensed a high amplitude signal for a given duration of time. The output of the detector and time delay circuit 80 is applied to a diode D2 which is connected in series by a resistor R28 to capacitor C1. Normally the diode D2 is back biased thereby not affecting the charge across capacitor C1, and isolating capacitor C1 from the detector and delay circuit 80. If not reset by pulses from amplitude discriminator 70, the time delay circuit 80 will bias the diode D2 to a conductive condition thereby discharging capacitor C1 through the detector and delay circuit 80.

FIGURE 1 further illustrates an additional control circuit to permit the use of a motor 38 to control an iris 30 associated with the lens 32. In this circuit, an error voltage taken from the capacitor C1 is used to open or close the iris 30 and thereby achieve a light level control range of approximately 1000 to one. One specific embodiment of such a circuit may comprise a typical cathode follower 72, wherein the error signal from capacitor C1 is applied to the grid of tube T1 which has been properly biased by a suitable voltage applied to its plate. The output of the cathode follower 72 is taken from the cathode of tube T1 which is connected to a suitable negative potential by a resistor R5, and applied to the motor 38 while a reference voltage 40 is applied to the other terminal of the motor 38. The output shaft of the motor 38 is connected to an appropriate gear system 36, which is in turn adapted to open or close the iris 30.

A DC amplifier 90 is so connected so as to amplify the voltage impressed across the capacitor C1, and to apply its output voltage to the losser amplifier 50 thereby controlling the gain of the losser amplifier 50.

The block circuitry shown in FIGURE 1 is designed specifically to control the output signal of the vidicon camera tube 10 to achieve a light compensating system for a slow scan television whereby light compensation is achieved rapidly over a wide range of light intensities. In operation, an increase in the output of the vidicon tube 10 is applied successively to the losser amplifier 50 and the video amplifier 60; when the voltage output from the video amplifier 60 exceeds the voltage at the junction of resistors R1 and R2 the diodes D3 and D1 will be successively biased in a forward direction through resistor R3 thereby charging capacitor C1 more negatively. The increased negative voltage across capacitor C1 will be applied through the DC amplifier 90 to the losser amplifier 50 thereby reducing the gain of the losser amplifier 50 and restoring the output signal of the television system. By modifying the value of the resistance R3, it is possible to make the feedback control of this circuit proportional to the integral of the vidicon tube 10 output thereby ignoring the intense signals of small bright spots.

The second feedback circuit of FIGURE 1 illustrates a method of discharging the capacitor C1 which overcomes the disadvantages of using the resistor R4. The operation of this second feedback circuit to correct the gain of the losser amplifier 50 will be set forth below. The output signal of the video amplifier 60 is connected to the amplitude discriminator 70. The peak output of the video amplifier 60 must be below a certain preset level in order that the amplitude discriminator 70 may become operative. This threshold is normally set one to two db in output level below the level at which the diodes D1 and D3 are biased to conductive condition. The signal output of the amplitude discriminator 70 is applied to the detector and time delay circuit 80 wherein the signal is rectified and used to charge a time delay circuit. The discharge time constant of this RC circuit is chosen so that the level must drop below the amplitude discriminator 70 threshold level for a period greater than one frame (the time required to scan the image within the vidicon tube 10) before the detector and time delay circuit 80 will operate to discharge the capacitor C1.

In normal operation, the diode D2 is back-biased thus preventing the capacitor C1 from discharging and thereby maintaining a constant voltage on the capacitor C1. When the detector and time delay circuit 80 has failed to receive a delay reset input signal for a given period greater than one frame, this circuit will act to bias the diode D2 to a conductive condition thereby discharging the capacitor C1. As the value of the voltage across capacitor C1 is reduced or drawn toward zero, the voltage applied to the losser amplifier 50 will be reduced thereby causing the gain of the losser amplifier 50 to increase and thereby compensate for the reduction of the output of the vidicon tube 10. One significant aspect of this feedback circuit provides that if the video amplifier 60 output is normal or above, the diode D2 will remain back-biased and will remain in that condition even if only once during each frame the video amplifier 60 output rises above the threshold value of the amplitude discriminator 70. This feature ensures that the gain will be referenced to the peak white signal in the scene viewed by the vidicon tube 10 regardless of the area of the white portion of the picture.

In summary, the compensating feedback circuits operate in the following manner. Initially with no signal input, the detector and time delay circuit 80 after one frame time has elapsed will cause the capacitor C1 to discharge thereby causing the gain of the losser amplifier 50 to increase. As the level of the signal being applied to the video amplifier 60 increases, a voltage level will be reached when the diodes D1 and D3 will be biased forward thereby charging the capacitor C1 to reduce the losser amplifier 50 output level to a predetermined value. During the operation of this television system, if the signal input level is increased the gain is reduced almost immediately by charging the capacitor C1 through diode D1. If the input level is reduced, the gain of the losser amplifier 50 will stay constant for one frame period at which time it will start to rise until the output level rises to meet the threshold value determined by the amplitude discriminator 70 at which time the first feedback circuit will take over to stabilize the gain.

As explained above, an additional system provided by the motor 38 and the gear system 36 is provided to adjust the iris 30 in response to an error voltage tapped off above the capacitor C1. The reference voltage 40 is chosen so that with the gain of the losser amplifier 50 set mid-way between maximum and minimum, the voltage at the cathode of tube T1 is the same as the reference of the other side of the motor 38. Thus, when the losser amplifier 50 is operating at a constant median gain, the motor does not run. If the input to the losser amplifier 50 suddenly increases, the voltage across capacitor C1 becomes more negative with the result that the cathode of tube T1 likewise becomes negative and the motor 38 starts to operate in a direction to close the iris 30 of the lens 32. If the input to the losser amplifier 50 suddenly decreases, the voltage across capacitor C1 will drop after a delay of one frame. As the voltage at the cathode of tube T1 begins to rise above the reference voltage 40, the motor reverses directions and operates to slowly open the iris 30. Therefore, motor speed will be an increasing function of the error voltage. This is a desirable situation since it permits a single motor and simple control circuitry to operate satisfactorily with both large and small step changes in the light input to the vidicon tube 10.

With reference now to FIG. 2, there is shown in detail one specific embodiment of the circuitry which would be suitable for providing compensation of the signal output of the vidicon tube 10. With specific reference to the losser amplifier 50, the signal from the video preamplifier 100 is applied through a capacitor C2 and a resistor R7 to the plate of tube T2. The grids of the tubes T2 and T3 are interconnected and have applied thereto a D.C. voltage which controls the gain of the losser amplifier 50. The cathodes of both tubes T2 and T3 are respectively connected to ground whereas the plates of tubes T2 and T3 are respectively connected to suitable sources of voltage through resistors R8 and R10. The plates of tubes T2 and T3 are interconnected by a resistor R9 and capacitor C3 connected in series. The resistor R7 and the resistance of tube T2, and resistor R9 and the resistance of tube T3 form successive voltage dividers through which the input signal may be successively attenuated. The capacitors C2, C3 and C4 act merely to isolate the D.C. components originating in the various portions of this circuit. In operation, as an increased D.C. voltage is applied to the grids of the tubes T2 and T3, these tubes will begin to conduct thereby lowering the resistance presented across their respective portions of the circuit. Therefore, as the plate resistances of tubes T2 and T3 are progressively decreased the A.C. voltages impressed across each of the tubes will be decreased with the result that the output from the losser amplifier 50 will be decreased. Conversely, as the voltage applied to the grids of tubes T2 and T3 is decreased, the plate resistance and therefore the voltage presented across the tubes T2 and T3 will be increased thereby increasing the output of the losser amplifier 50.

The output of the losser amplifier 50 is then applied to the video amplifier 60 which is of a type common in the art. As can be seen in FIG. 2, the video amplifier 60 is a dual amplifier including a pair of tubes T4 and T5. The input is applied across load resistor R29, which is connected to ground, to the grid of tube T4, which has been properly biased by a resistor R13 connected to suitable positive source of voltage and by a resistor R11 and capacitor C5 connected in parallel to ground. The plate of tube T4 is connected across an isolating capacitor C6 to the grid of tube T5. Tube T5 is properly biased by connecting its plate to a suitable source of voltage through resistor R14, by connecting the cathode of tube T5 to ground through resistor R12 and by tying the grid to ground through resistor R30. The output of the video amplifier 60 is provided directly from the plate of tube T5.

The output of video amplifier 60 is applied to the amplitude discriminator 70 through an isolating capacitor C7 to crystal rectifier CR1. The threshold level at which the amplitude discriminator 70 will respond to reductions in the signal output of the video amplifier 60 is determined by the voltage at which crystal rectifier CR1 is back-biased. The level of this voltage is determined by a resistance network comprising a variable resistor R16 having one end connected to ground and the other series connected to a positive potential through resistor R17. The tap of variable resistor R16 is in turn connected to the crystal rectifier CR1 through a resistor R15. When the peak of the signal is more negative than the predetermined level, the crystal rectifier CR1 which is back-biased is placed in a conducting condition to thereby place a voltage across resistor 18 which is connected to ground. Resistor R18 is also connected to the grid of tube T6; the cathode of tube T6 is tied to ground and the plate is biased through resistor R19 to a suitable positive potential. The plate of tube T6 is also connected in series through capacitor C8 to the grid of tube 17. Tube 17 is kept in a nonoperative condition by a negative voltage applied to its grid by a voltage divider comprising a resistor R20 which is connected to a negative source of potential and the grid of tube T7, and a resistor R21 which connects the grid of tube T7 to ground. Under normal operating conditions when the light input into the vidicon tube 10 remains substantially constant, the negative peak of the video output signal representing the white portion of the signal is of sufficient amplitude to overcome the reverse biased placed on the crystal rectifier CR1. When negative peaks of the video output signal are applied to the crystal rectifier CR1, the rectifier CR1 is biased forward thereby imposing a negative voltage on the grid of tube T6. When the crystal rectifier CR1 is back-biased, the tube T6 is operative in a highly conductive condition. However, when a negative signal is placed on the grid of tube T6, the tube T6 assumes a high impedance condition thereby increasing the voltage appearing at the plate of tube T6. It may be seen that when the crystal rectifier CR1 is in a non-conductive condition, a negative voltage is applied to the grid of tube T7 thereby placing this tube in the non-conductive condition. When the crystal rectifier CR1 is biased conductively, the voltage placed on the plate of tube T6 will become increasingly positive thereby driving the grid of tube T7 positively and causing tube T7 to become conductive. A positive source of voltage is connected through resistor R22 to the plate of tube T7; the cathode of tube T7 is connected to ground. When the tube T7 is in a non-conductive state due to the presence of a negative voltage placed upon its grid, the output signal taken from the plate of tube T7 is a high positive voltage; however, when the crystal rectifier CR1 is driven to its conductive condition and as a result tube T7 is placed in a conductive condition, the voltage upon the plate of tube T7 will drop.

The output signal of the amplitude discriminator 70 (i.e. the voltage placed on the plate of tube T7) is applied to a Zener diode Z1 of the detector and time delay circuit 80. The Zener diode Z1 is further connected through resistor R23 to a suitable source of negative potential and to a crystal rectifier CR2 which is in turn connected to ground through resistor R24, which is connected in parallel with capacitor C9. The crystal rectifier CR2 is further connected through the diode D2 and resistor R28 to capacitor C1. When the peak of the output signal of the video amplifier 60 does not exceed the threshold determined by the amplitude discriminator 70, a high positive voltage (as explained above) will be applied to the Zener diode X1. A reduced positive voltage will be reflected across the Zener diode Z1 thereby biasing the crystal rectifier CR2 to a non-conductive state. At a result, capacitor C9 will begin to discharge through resistor R24 to the point when diode D2 is biased to a conductive condition. The impedance values of capacitor C9 and resistor R24 have been chosen to provide a time constant which is in slight excess of the frame time of vidicon tube 10. Therefore, when the output of the vidicon tube 10 decreases, and the negative peak value of the video amplifier output does *not* exceed the threshold value determined by the amplitude discriminator 70 for a period in excess of the frame time of the tube 10, the diode D2 will be biased conductively thereby reducing the charge on capacitor C1. As a result, the reduced voltage applied to the losser amplifier 50 through the DC amplifier 90 will increase the gain of the losser amplifier 50 thereby restoring the output signal of this system.

On the other hand, when the negative peak signal of the video amplifier 60 exceeds the level determined by the amplitude discriminator 70, the positive voltage appearing at the plate of tube T7 will drop thereby driving the Zener diode Z1 to an inoperative condition. As a result, the negative potential connected to resistor R23 will be applied to the crystal rectifier CR2 thereby biasing the rectifier CR2 to a conductive condition. The negative potential will then be applied to capacitor C9 charging it to a level at which diode D2 will be back-biased. Therefore, if the level of the output signal of the video amplifier 60 is at its desired level and the peak value of the output signal exceeds at least once during each frame the threshold value determined by the amplitude discriminator 70, the detector and time delay 80 will in effect be reset and the diode D2 will remain back-biased and the charge on capacitor C1 will remain substantially constant. However, if the value of the output signal of the video amplifier 60 decreases for a period greater than one frame period, the capacitor C1 will be discharged increasing the gain of the losser amplifier 50 to restore the output signal.

The voltage impressed across capacitor C1 is used as an error signal to control the gain of the losser amplifier 50. It has been found expedient in this embodiment of the invention to apply the error signal of capacitor C1 through the D.C. amplifier 90 to the grids of tubes T2 and T3. The capacitor C1 is connected to the grid of tube T8 of the D.C. amplifier 90, whereas the cathode of tube T8 is tied to ground and the plate is biased at a proper voltage by a resistor R25 which is connected to a positive voltage and resistors R27 and R26 which are connected to a suitable negative potential. A voltage output of the D.C. amplifier 90 is taken from the point of interconnection of resistors R27 and R26. As noted above, the error signal applied to the D.C. amplifier 90 is also used to control the amount of light admitted through the iris 30 of the vidicon tube 10.

In order to present a specific embodiment of this invention, values for the various types of impedance elements and type designations for the tubes and rectifiers will be given below:

| Reference No. | Component | Type or Value |
|---|---|---|
| C2 | Capacitor | .01 mfd. |
| R7 | Resistor | 47K |
| T2 | Tube | ½ 6DJ8 |
| C3 | Capacitor | .01 mfd. |
| R8 | Resistor | 47K |
| T3 | Tube | ½ 6DJ8 |
| R9 | Resistor | 47K |
| C4 | Capacitor | .001 mfd. |
| R10 | Resistor | 47K |
| R29 | do | 470K |
| R11 | do | 1.2K |
| C5 | Capacitor | 50 mfd. |
| T4 | Tube | ½ 6922 |
| C6 | Capacitor | .001 mfd. |
| C7 | do | .001 mfd. |
| R12 | Resistor | 2.7K |
| R15 | do | 100K |
| R14 | do | 50K |
| R13 | do | 47K |
| R16 | do | 300K |
| R17 | do | 6.67M |
| CR1 | Crystal Diode | IN459A |
| R18 | Resistor | 100K |
| T6 | Tube | ½ 12AX7 |
| C8 | Capacitor | .001 mfd. |
| R21 | Resistor | 220K |
| R20 | do | 1.8M |
| T7 | Tube | 12AX7 |
| R22 | Resistor | 22K |
| Z1 | Zener Diode | Two IN985B's in series |
| R23 | Resistor | 120K |
| CR2 | Crystal Diode | IN459A |
| C9 | Capacitor | 2 mfd. |
| R24 | Resistor | 44M |
| D2 | Diode | 6AL5 |
| R3 | Resistor | 3.6M |
| C1 | Capacitor | 4 mfd. |
| D1 | Diode | CD 1143 |
| R1 | Resistor | 3.4Mg |
| R2 | do | 51K |
| T8 | Tube | ½ 6922 |
| R25 | Resistor | 470K |
| R26 | do | 470K |
| R27 | do | 390K |
| R28 | do | 10M |

| Reference No. | Component | Type or Value |
|---|---|---|
| R30 | do | 470K |
| C11 | Capacitor | .02 |
| D3 | Diode | IN459A |
| R31 | Resistor | 220K |
| C10 | Capacitor | .01 |

It will, therefore, be apparent that there has been disclosed a compensation circuit for a slow scan television capable of quickly responding to a decrease in the output signal of an image pickup tube and which is sensitive to viewed images over a wide range of light intensity. Specifically, there has been shown a feedback circuit including a storage means such as a capacitor for regulating the gain of a losser amplifier. The compensating feedback circuit operates to sense a decrease in the average value of the output of the image pickup tubes as amplified and in effect to time the duration of this decrease before applying a corrective voltage to the losser amplifier.

While there have been shown and described what are presently considered to be the preferred embodiments of the invention, modifications thereto will readily occur to those skilled in the art. It is not desired, therefore, that the invention is limited to the specific arrangements shown and described and it is intended to cover in the appended claims all such modifications as fall within the true spirit and scope of the invention.

I claim as my invention:

1. A slow scan television system comprising an image pickup device having a signal output and wherein the photoconductive layer of said device is being scanned at a given frame time, a variable amplifier means responsive to the output signal of said device, and a feedback circuit for detecting and compensating for variations in the output signal of said amplifier means, said feedback circuit comprising discriminating means for sampling the output signal of said amplifier means to produce an output signal in response to an output signal of said amplifier means below a predetermined level, and a timing means responsive to the output signal of said discriminating means to change the gain of said variable gain amplifier after an interval of time approximately equal to said frame time during which the output signal of said discriminating means has been applied to said timing means.

2. A slow scan television system comprising an image pickup device having a signal output and a photoconductive layer which is scanned at a predetermined frame time, a first means operatively connected with said device for amplifying the output signal of said device, the gain of said first means being a function of a corrective signal applied to said first means, a storage means operatively associated with said first means for developing a storage signal which in turn produces said corrective signal, and a feedback circuit for detecting and compensating for variations in the output signal of said first means, said feedback circuit including a second means operatively associated with said first means to produce an output signal in response to an output signal of said first means below a predetermined value, and a third means operatively associated with said storage means and said second means for varying the storage signal of said storage means after an interval of time approximately equal to said frame time.

3. A slow scan television comprising an image pickup device having an output signal, a variable gain amplifier means responsive to the output signal of said device, a storage means for developing a storage signal to be applied to said amplifier means for regulating the gain of said amplifier means, a first feedback means operatively associated with said amplifier means and said storage means to detect increases in the output of said amplifier means and to correspondingly vary the storage signal of said storage means, and a second feedback means to detect decreases in the signal output of said amplifier means, said second feedback means comprising a discriminating means for sampling the output signal of said amplifier means to produce an output signal in response to an output signal of said amplifier means below a predetermined level and a timing and delay means operatively associated with said discriminating means and said storage means to vary the storage signal of said storage means when the output signal of said discriminating means has existed for a period greater than a predetermined time.

4. A slow scan television system comprising an image pickup device having an output signal and a photoconductive layer which is scanned at a predetermined frame time, a first means operatively connected to said device for amplifying the output signal of said device, said gain of said first means being a function of a corrective signal, a storage means for maintaining a storage signal which is applied to said first means as said corrective signal, a first feedback means operatively connected to said first means and said storage means for detecting increases of the output signal of said first means above a first predetermined level to thereby vary the storage signal of said storage means, and a second feedback means to detect decreases in the output signal of said first means, said second feedback means comprising a second means operatively connected to said first means to produce an output signal in response to an output signal of said first device below a second level set approximately 1 db below said first level, and a third means operatively connected to said second means and said storage means to vary the storage signal of said storage means after an interval of time approximately equal to said frame time during which the output signal of said second means has been applied to said third means.

5. A slow scan television system comprising an image pickup device having an output signal and a variable iris associated with the lens of said device, an amplifier means responsive to the output signal of said device and whose gain is a function of a corrective signal, a discriminating means for sampling the output signal of said amplifier means to produce an output signal in response to an output signal of said amplifier means below a predetermined value, a timing and delay means operatively associated with said discriminating means to vary the magnitude of said corrective signal after a predetermined intreval of time and a motivating means operatively connected to said iris and responsive to said corrective signal to regulate the amount of light passing through said iris.

6. A slow scan television system comprising an image pickup device with a variable iris associated with the lens of said device and with an output signal, an amplifier means responsive to the output signal of said device and whose gain is a function of a correction signal, a storage means operatively connected to said amplifier means for developing and maintaining a storage signal which in turn produces and is proportional to said corrective signal, a feedback circuit for detecting and compensating variations in the output signal of said amplifier means, said feedback circuit comprising a discriminating means to sample the output signal of said amplifier means and to produce an output signal in response to an output signal of said amplifier means below a predetermined value and a timing and delay means operatively connected to said storage means and said discriminating means to vary the storage signal of said storage means when the output signal of discriminating means exists for a predetermined period of time, and a motivating means operatively connected to said iris and said storage means and being responsive to the storage signal of said storage means to regulate the amount of light passing through the iris.

7. A slow scan television system capable of responding quickly to variations in light over a great range of intensities, said system comprising an image pickup device having a variable iris associated with the lens of said device, and a photoconductive layer which is scanned of a predetermined frame time to provide an output signal, a first means operatively associated with said device to amplify the output signal of said device, the gain of said first means being a function of a corrective signal applied to said first means, a storage means operatively connected to said first means for developing and maintaining a storage signal which in turn is proportional to and controls said corrective signal, a first feedback circuit operatively connected to said first means and said storage means for detecting increases in the output signal above a first predetermined level of said first means and to thereby vary the storage signal of said storage means, a second feedback circuit for detecting decreases in the output signal of said first means, said second feedback circuit comprising a second means for sampling the output signal of said first means to produce an output signal in response to said output signal of said device below a second predetermined level and a third means operatively connected to said second means and said storage means to vary the storage signal of said storage means when the output signal of said second means exists for a period in slight excess of said frame time, and a fourth means for motivating operatively connected to said storage means and said iris to vary the light passing through said iris as a function of the storage signal which is applied to said fourth means.

8. A slow scan television system substantially as claimed in claim 11 wherein said second predetermined level is set approximately 1 db below said first predetermined level.

9. A radiation compensation system for a slow scan television camera device having a target element which is scanned in a pattern by an electron beam within a given time interval, said system comprising first means operatively associated with said camera device for amplifying the output signal of said camera device, said first means having a variable gain, storage means connected to said first means for providing a storage signal which controls the gain of said first means, second means for measuring the output signal of said first means to produce an output signal in response to the output signal said first means below a predetermined level, and third means operatively associated with said storage means and said second means for varying sad storage signal of said storage means after said interval of time in which the output signal of said second means has been applied to said third means.

10. A slow scan television system including an image pickup device having an output signal, variable gain amplifier means operatively responsive to said output signal of said device, means for providing a corrective signal to vary the gain of said amplifier means, discriminating means operatively associated with said amplifier means to produce an output signal in response to an output signal of said amplifier means below a predetermined value, and timing and delay means operatively associated with said discriminating means and said means for providing a corrective signal for effecting a change of said corrective signal after a predetermined interval time in which said output signal of said discriminating means has been applied to said timing and delay means.

References Cited

UNITED STATES PATENTS

| | | | |
|---|---|---|---|
| 2,402,445 | 6/1946 | Poch. | |
| 3,154,740 | 10/1964 | Eness | 325—319 |
| 3,230,458 | 1/1966 | Stangeland | 325—410 |

ROBERT L. GRIFFIN, *Primary Examiner.*

R. L. RICHARDSON, *Assistant Examiner.*